United States Patent

Guerr

[11] Patent Number: 5,247,852
[45] Date of Patent: Sep. 28, 1993

[54] COUPLING FOR HANDLEBAR CONTROLS

[75] Inventor: Herbert Guerr, Torrance, Calif.

[73] Assignee: Applied Tectonics, Inc., Torrance, Calif.

[21] Appl. No.: 940,232

[22] Filed: Sep. 3, 1992

[51] Int. Cl.$^5$ .............................................. B62K 23/00
[52] U.S. Cl. ..................................... 74/551.8; 403/88; 403/90
[58] Field of Search ................. 74/551.4, 551.8, 502.2; 403/83, 88, 90, 114, 141, 142; 280/281.1

[56] References Cited

U.S. PATENT DOCUMENTS

| 169,383 | 11/1875 | Starr | 403/90 |
|---|---|---|---|
| 511,479 | 12/1893 | Westbrook | 403/90 X |
| 569,436 | 10/1896 | Spurr | 74/551.4 |
| 589,045 | 8/1897 | Temple | 74/551.4 |
| 620,242 | 2/1899 | Lusebrink | 74/551.4 |
| 1,574,899 | 3/1926 | Kellogg | 403/90 X |
| 4,227,826 | 10/1980 | Conrad | 403/90 X |
| 4,619,543 | 10/1986 | Vollmer et al. | 403/114 |

FOREIGN PATENT DOCUMENTS

| 373621 | 1/1907 | France | 74/551.4 |
|---|---|---|---|
| 30733 | of 1897 | United Kingdom | 74/551.4 |
| 894069 | 9/1960 | United Kingdom | 403/142 |

Primary Examiner—Rodney H. Bonck
Assistant Examiner—Ryan W. Massey
Attorney, Agent, or Firm—Michael A. Painter

[57] ABSTRACT

A coupling for interfacing hand controls to a handlebar which provides for adjustment about multiple axes of rotation. A positioning collar having an inner cylindrical bore and outer spherical surface is mounted upon the handlebar of a bicycle, motorcycle or other like vehicle. A hand control for the vehicle such as a bar end, brake lever, throttle control, shift lever or clutch lever is provided with a receiving sleeve having an inner surface which is adapted to slidably engage the outer surface of the collar. The force imposed upon the collar by the sleeve may be reduced to allow adjustment of the hand control or increased to fix the hand control in the selected position. When being adjusted, the hand control may be repositioned along the longitudinal axis of the handlebar, rotated about the axis of the handlebar and rotated about an axes which are angularly deflected to the longitudinal axis of the handlebar.

8 Claims, 2 Drawing Sheets

COUPLING FOR HANDLEBAR CONTROLS

BACKGROUND OF THE INVENTION

1. Field of the Invention

The present invention generally relates to hand controls for bicycles and like vehicles and, more particularly, to hand control couplings which provide for multiple axes of adjustment.

2. Prior Art

The basic purpose of the present invention is to provide a coupling for handlebar controls which allows positioning of the controls about multiple axes of rotation. Although the present invention will be described with respect to interfacing conventional controls to a bicycle handlebar, it is understood the present invention is equally applicable to all other classes of equipment which use hand controls which must be adjusted to meet the requirements of the operator. Conventional bicycles exhibit a variety of handlebar shapes and styles. Irrespective of the style of handlebar or the orientation of the handlebar tube, none contribute more than the minimum ability to adjust mounted hand controls.

In the typical assembly described in the prior art, hand controls are mounted upon cylindrical handlebar tubes. Irrespective of the control (e.g., hand brake, shift lever, bar end, etc.), positioning of the control is limited to two degrees of freedom. The conventional controls described by the prior art utilize a clamping sleeve to directly secure the position of the hand control along or about the axis of the handlebar tube. By releasing the clamping sleeve, the control may be positioned along or about the longitudinal axis of the tube. Unfortunately, this limitation fails to address the requirements of most operators. The inability to provide for lateral adjustments (i.e., rotation about an axis angularly deflected from the longitudinal axis of the handlebar tube) is an inherent defect in all assemblies disclosed by the prior art.

The present invention substantially resolves those problems displayed by conventional handlebar systems. A collar is deposed about the handlebar tube which is adapted to receive the hand control. The collar comprises a split engagement member having an inner bore adapted to slidably engage the handlebar tube. The outer surface of the collar is a partial spherical section the surface of which substantially intersects the surface of the tube. The hand control housing is provided with a clamping sleeve, the inner surface comprising a partial spherical section which is adapted to slidably engage the outer spherical surface of the collar. When a clamping force is imposed on the sleeve, both the position of the collar and the hand control may be fixed at a selected location on the handlebar tube. Like the devices taught by the prior art, the present invention provides the ability to position the hand control along and about the longitudinal axis of the handlebar tube. Most importantly, the present invention permits the hand control to be positioned about multiple axes of rotation which are angularly spaced or deflected from the longitudinal axis of the tube.

SUMMARY OF THE INVENTION

The present invention is intended to provide means to couple hand controls to a handlebar system for a bicycle or other vehicles whereby the hand controls may be adjusted about multiple axes of rotation. Because handlebars for bicycles and like vehicles are manufactured in a vast variety of styles, it has become increasingly evident that improvements in the means to couple hand controls to handlebars are necessary. Handlebar systems are being employed which are unlimited as to shape and general configuration. As a result, requirements which satisfy operator convenience are not met by the systems disclosed by the prior art.

The present invention may be incorporated into a variety of hand controls, including bar ends, hand brakes, throttles and shifting levers. The present invention allows a hand control to not only be positioned along and about the longitudinal axis of the handlebar tube, it permits the control to be rotatably adjusted about an axis which is angularly offset from the longitudinal axis of the handlebar tube.

A split collar slidably engages the exterior surface of the handlebar tube. The exterior surface of the collar is a spherical section which substantially intersects the exterior surface of the handlebar tube. The hand control housing is provided with an interior clamping sleeve which is adapted to slidably engage the partial spherical surface of the collar. When the sleeve is tightened, both the collar and the hand control will be fixed in a position along and about the handlebar tube. The interface between the collar and sleeve allows rotation of the hand control about a positional axis which is offset from the longitudinal axis of the handlebar tube.

It is therefore an object of the present invention to provide an improved handlebar system for coupling hand controls thereto.

It is another object of the present invention to provide a coupling for a handlebar controls which permits adjustment of the controls about multiple axes of rotation.

It is still another object of the present invention to provide a coupling for hand controls which permit the hand control to be positioned about an axis which is angularly offset from the longitudinal axis of a vehicle handlebar.

It is still yet another object of the present invention to provide a coupling for bicycle hand controls which is simple and inexpensive to fabricate.

The novel features which are believed to be characteristic of the invention, both as to its organization and method of operation together with further objectives and advantages thereof, will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

DESCRIPTION OF THE PRESENTLY PREFERRED EMBODIMENT

Figure 1:
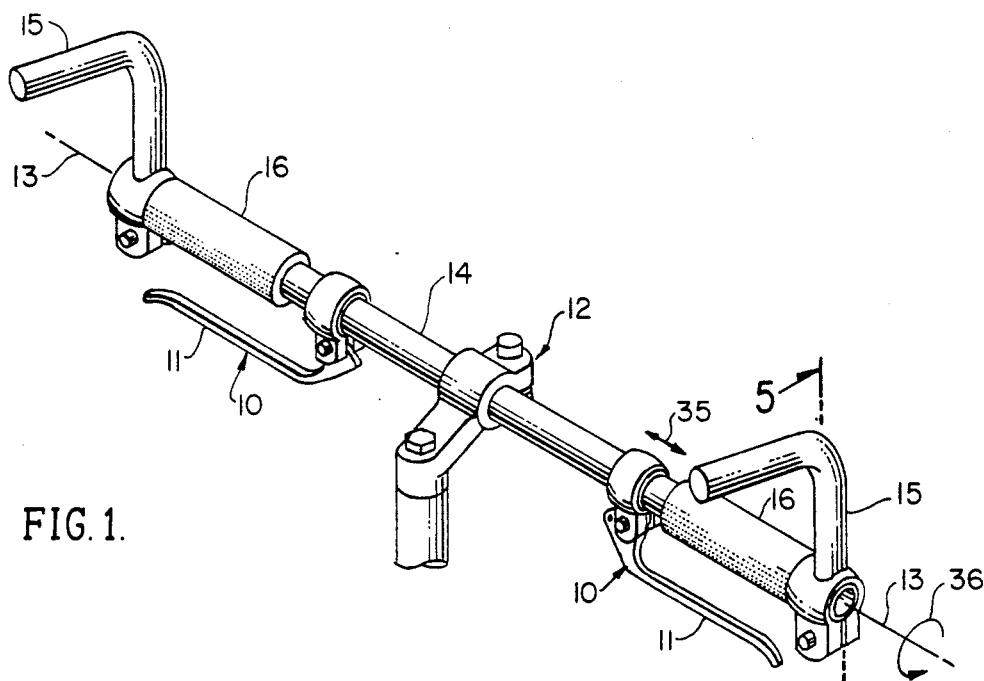
FIG. 1 is a perspective view of a handlebar assembly and mounted hand brakes and bar ends coupled to the handlebars in accordance with the present invention.

An understanding of the present invention may be best gained by reference to FIG. 1 wherein a perspective view of a handlebar system 12 having hand brakes and bar ends mounted in accordance with the present invention may be best seen. As stated, it is an objective of the present invention to provide an improved coupling for mounting a variety of hand controls to a handlebar system. Although the present invention will be described with respect to hand controls in the form of hand brakes and bar ends, it is understood the present invention may be employed with respect to throttles, shift levers, clutch levers, bar ends and all other conventional hand controls used for vehicles utilizing handlebar systems such as bicycles, motorcycles and the like.

Figure 2:
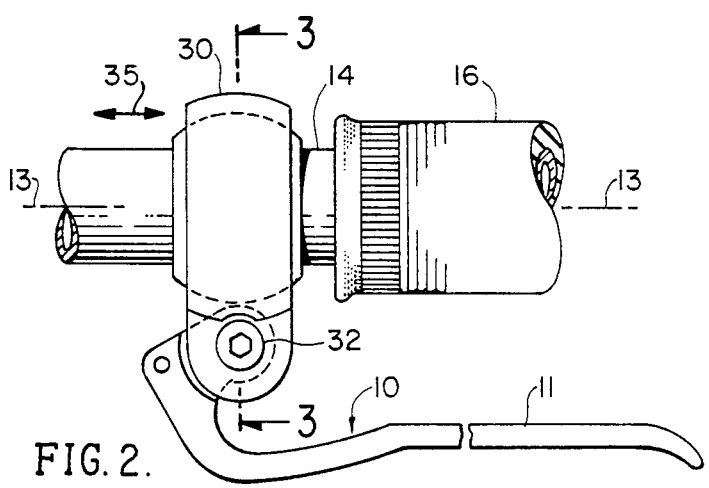
FIG. 2 is a side elevation enlarged view of the hand brakes shown in FIG. 1 coupled to handlebars in accordance with the present invention.

In FIG. 1, a pair of hand brakes 10 and bar ends 15, separated by conventional grips 16, are mounted upon a handlebar system 12 typically of the type used for mountain bicycles. The present invention is independent of the type of handlebar system employed and may be employed with equal effectiveness for handlebar systems having other configurations. An objective of the present invention is to provide means to position hand brakes 10 and bar ends 15 in a manner which will fully satisfy the physical demands and needs of the operator. The positioning of hand brakes 10 is defined with respect to their linear position along the longitudinal axis 13 of the handlebar tube 14, the angular position of hand brakes 10 about longitudinal axis 13 and the vertical and transverse deflection of brake handle 11 of hand brakes 10 with respect to longitudinal axis 13 (FIG. 2). The positioning of bar ends 15 is defined with respect to multiple axes of rotation relative to the longitudinal axis 13 of handlebar tube 14. The present invention is distinguished from those devices taught in the prior art by its ability to alter the angular deflection between the hand control (i.e., hand brakes 10 and bar ends 15) and the longitudinal axis 13 of handlebar tub 14.

The construction of a coupling in accordance with the present invention may be best understood by reference to FIGS. 3, 4, 5 and 6. Prior to the present invention, the means taught by the prior art to couple hand controls to handlebar systems permitted positioning the controls only along or about the longitudinal axis 13 of the handlebar tube 14. The devices taught by the prior art provide no ability to spatially offset the control with respect to the longitudinal axis 13 of handlebar tube 14.

To meet the objectives of the present invention, an engagement collar 20 in the form of a spherical section is slidably mounted upon the surface 21 of handlebar tube 14. As can be best seen in FIGS. 6a, 6b and 6c, a split collar 20 has a cylindrical inner bore 22 which has a diameter which permits it to slidably engage the cylindrical outer surface 21 of handlebar tube 14. As can be best seen in FIG. 6c, the outer surface 23 of split collar 20 comprises a partial section of a sphere. It is understood that, although the range of angular deflection is determined by the extent of the interface between the hand control and the spherical surface 23 of collar 20, the dimensions and specifications of the spherical surface 23 do not limit the scope of the present invention. To construct collar 20 and permit the imposition of a clamping force against tube surface 21, the ring structure of collar 20 is split, i.e., a radial section 24 of the spherical surface 23 is cut out. When an inwardly directed clamping force is imposed upon spherical surface 23, the inner cylindrical diameter of inner bore 22 is reduced thereby securing split collar 20 and the coupled hand control at a predetermined position on handlebar tube 14. Although engagement collar 20 has been illustrated and described in the form of a split ring structure, it is recognized that a collet having a spherical outer surface could be used in lieu thereof.

Figure 3:
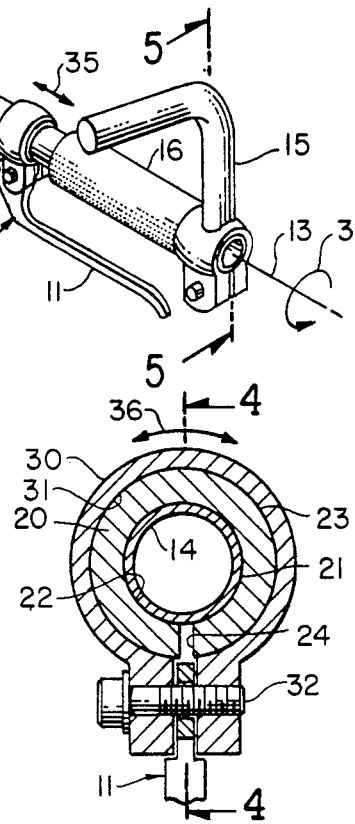
FIG. 3 is a cross-sectional view of the present invention coupling shown through line 3—3 of FIG. 2.
Figure 4:
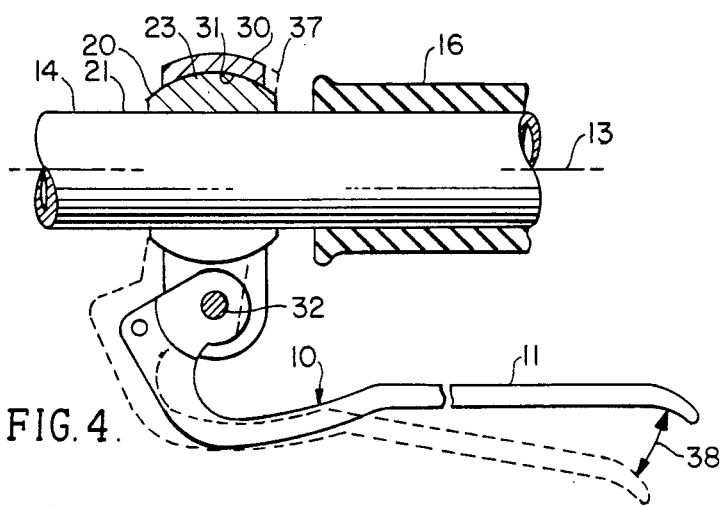
FIG. 4 is an enlarged, partial, cross-sectional view of a hand brake coupled to a handlebar tube as shown in FIG. 2 taken through line 4—4 of FIG. 3.
Figure 5:
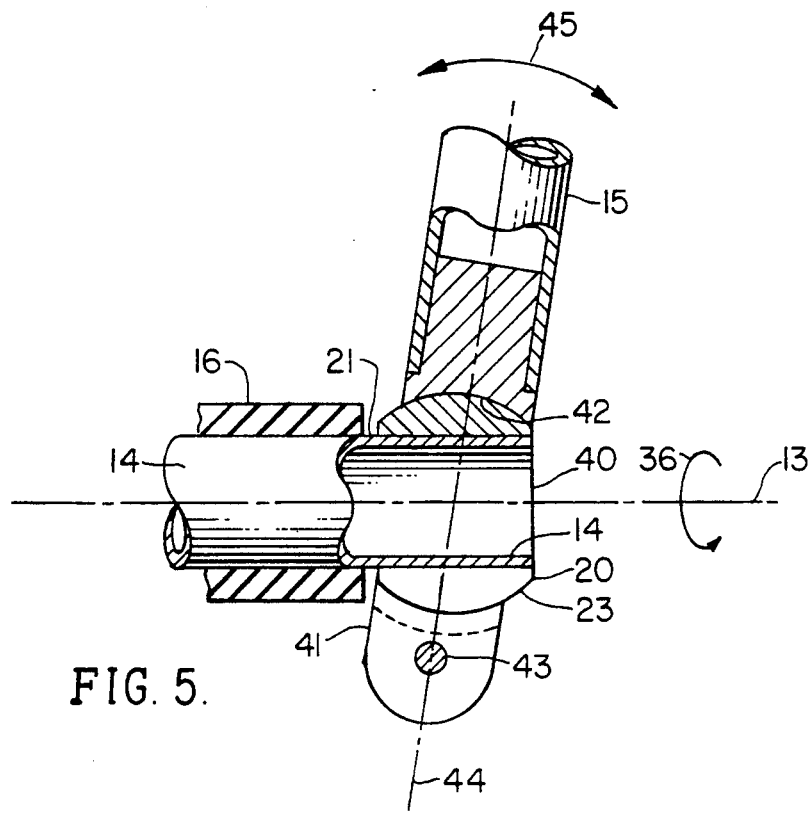
FIG. 5 is an enlarged, partial cross-sectional view of a bar end coupled to a handlebar tube as shown in FIG. 1 taken through line 5—5 of FIG. 1.
Figure 6A:
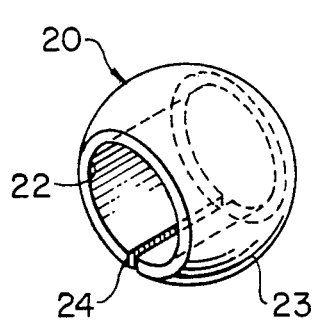
FIGS. 6a, 6b and 6c illustrate a perspective view, side elevation and elevation view of the spherical collar shown in FIG. 3 and FIG. 4.
Figure 6B:
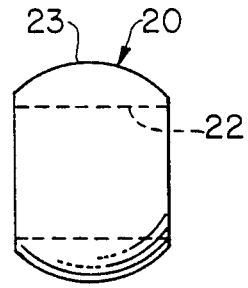
Figure 6C:
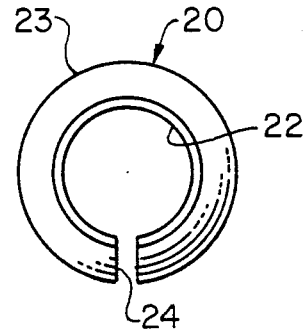

The interface between split engagement collar 20 and hand brake 10 may be best seen by reference to FIG. 2, 3 and 4. Hand brake 10 comprises a conventional outer housing 30 which is coupled to brake handle 11 in a conventional manner. In order to meet the objectives of the present invention, housing 30 is provided with a slotted clamping sleeve 31, the spherical surface of which is complementary to the spherical surface 23 of split collar 20. Housing 30 may be fixed in position with respect to handlebar tube 14 through the use of a conventional threaded bolt 32 which is adapted to be engaged with receiving threads in housing 30.

The advantage of the present invention relates to the ability to position hand controls in a manner which meet the requirements of the operator. Referring to FIG. 1, hand controls taught by the prior art can only be positioned at different locations along the longitudinal axis 13 (reference numeral 35) or be rotated about longitudinal axis 13 (reference numeral 36). On the other hand, the relative position between brake handle 11 and longitudinal axis 13 will remain unchanged. It is this inadequacy which is resolved by the present invention. As will be explained in detail hereinbelow, the devices taught by the prior art permit bar ends to be repositioned only by changing their position about the longitudinal axis 13 or by an axis of rotation which is integral with the construction of the bar end. The present invention will permit bar ends 15 to be positioned about multiple axes of rotation which are spatially offset from longitudinal axis 13.

When threaded bolt 32 releases the compressive force imposed by slotted clamping sleeve 31 on collar 20, housing 30 will be free to rotate across the spherical surface 23 of split collar 20. As shown in FIG. 3, rotation about the longitudinal axis 13 of handlebar tube 14 is represented by the reference numeral 36. The freedom of movement of hand brakes 10 provided by the present invention is best shown in FIG. 4. Since clamping sleeve 31 and split collar 2 interface at complementary spherical surfaces, hand brake 10, and in particular brake handle 11, may be repositioned relative to longitudinal axis 13. The greater the ratio between the diameter of spherical surface 23 and the width 37 of housing 30, the greater will be the range of the movement represented by the reference numeral 38. As shown, a coupling in accordance with the present invention will permit brake handle 11 to be transversely repositioned with respect to the longitudinal axis 13 of the handlebar tube 14, a characteristic which cannot be obtained with devices taught by the prior art.

The use of bar ends 15 have particular application with respect to the handlebar systems 12 used by mountain bicycles. Under the varying conditions under which mountain bicycles are used, it often becomes necessary for the operator to have differing degrees of leverage on the handlebar system. A bar end is a conventional device well understood by those having skill in the art. An understanding of the increased flexibility of bar ends 15 as provided by the present invention can be best seen by reference to FIG. 5. As described with respect to FIG. 3 and FIG. 4, an engagement collar 20 constructed in the manner shown in FIG. 6 is employed. Collar 20 has a cylindrical inner bore 22 which has a diameter which permits it to slidably engage the cylindrical outer surface 21 of handlebar tube 14. The outer surface 23 of split collar 20 comprises a partial, spherical section. A bar end 15 differs from hand brakes 10 in that it is mounted at the terminus 40 of handlebar tube 14. Bar end 15 includes an outer housing 41 which is provided with a slotted clamping sleeve 42 in the form of a spherical surface which is complementary to spherical surface 23 of split collar 20. As described with respect to hand brakes 10, housing 41 may be fixed in position with respect to the terminus 40 of handlebar tube 14 through the use of a conventional threaded bolt 43 which will provide an inwardly directed force upon spherical surface 23 of collar 20.

Conventional bar ends may be repositioned only by rotation about the longitudinal axis 13 of handlebar tube 14 (reference numeral 36) and, if provided, about the longitudinal axis 44 of the bar end. When mounted in accordance with the present invention, bar end 15 may be repositioned about axes of rotation which are spatially offset from longitudinal axis 13 of handlebar tube 14. As can be best seen in FIG. 5, when threaded bolt 43 is positioned to release the compressive force imposed on collar 20, housing 41 will be free to rotate across spherical surface 23 of collar 20. This will permit the longitudinal axis 44 of bar end 15 to be spatially repositioned relative to longitudinal axis 13 of handlebar tube 14, a characteristic which is unattainable with the devices taught by the prior art.

It can therefore be seen the present invention substantially improves the ability to couple hand controls to a handlebar system in a manner which will meet all positional objectives of an operator. Irrespective of whether repositioning is required merely for convenience or to meet physical necessities, hand controls intended to be mounted upon handlebar systems are provided with a full range of movement in a manner which meets the objectives of the present invention.

I claim:

1. An apparatus for coupling hand controls to a handlebar tube comprising:
   (a) an engagement collar having a partially spherical outer surface and a central bore disposed therethrough mounted upon and adapted to frictionally engage the handlebar tube;
   (b) a hand control housing having front and rear and first and second side surfaces, the distance between said front and rear surfaces being less than the diameter of the outer spherical surface of said engagement collar, a sleeve disposed through said housing from the front surface to the rear surface, said sleeve defining a spherical surface which is adapted to frictionally engage the partially spherical outer surface of said engagement collar, said hand control housing being coupled to said collar, said sleeve circumscribing the handlebar tube; and
   (c) means for clamping said hand control housing and engagement collar to the handlebar tube coupled intermediate the first and second side surfaces of the hand control housing.

2. An apparatus for coupling hand controls to a handlebar tube as defined in claim 1 wherein the surface of said central bore is cylindrical, the axis of said central bore extending through the center of said spherical outer surface, the interface between the ends of said cylindrical central bore and said spherical outer surface defining first and second planes, said planes being in parallel spaced relation to each other and being perpendicular to the axis of said cylindrical central bore.

3. An apparatus for coupling hand controls to a handlebar tube as defined in claim 2 wherein the distance between the front and rear surfaces of said hand control housing is less than the distance between the first and second planes formed at the interfaces between the central bore and the spherical outer surface of said engagement collar.

4. An apparatus for coupling hand controls to a handlebar tube as defined in claim 2 wherein the spherical outer surface of said engagement collar is partially discontinuous at a single location intermediate the first and second planes formed at the interfaces between the central bore and the spherical outer surface of said engagement collar.

5. An apparatus for coupling hand controls to a handlebar tube as defined in claim 4 wherein said sleeve is discontinuous at a single location intermediate the first and second side surfaces of said hand control housing, said means for clamping said hand control housing and engagement collar to the handlebar tube intersecting the discontinuity in said sleeve.

6. A coupling for securing hand controls to a cylindrical handlebar tube comprising:
   (a) an engagement collar having a partially spherical outer surface and a cylindrical central bore substantially equal in diameter to the cylindrical handlebar tube, said engagement collar having at least one slot from said central bore through to the spherical outer surface at a single location, said engagement collar being mounted upon and being adapted to frictionally engage the handlebar tube;
   (b) a hand control housing having front and rear and first and second side surfaces, the distance between said front and rear surfaces being less than the diameter of the outer spherical surface of said engagement collar, a clamping sleeve being disposed through said housing from the front surface to the rear surface, said sleeve defining a spherical surface which is adapted to frictionally engage the partially spherical outer surface of said engagement collar, said sleeve being discontinuous at a single location intermediate said first and second side surfaces, said hand control housing being coupled to said engagement collar and circumscribing the longitudinal axis of the cylindrical handlebar tube; and
   (c) clamping means for securing the hand control housing and engagement collar to the handlebar tube coupled intermediate the first and second side surfaces of the hand control housing and intersecting the discontinuity in said sleeve.

7. A coupling for securing hand controls to a cylindrical handlebar tube as defined in claim 6 wherein said central bore is cylindrical, the axis of said central bore extending through the center of said cylindrical outer surface and intersecting the spherical outer surface at first and second planes which are in parallel spaced relation to each other and perpendicular to the axis of said cylindrical central bore.

8. A coupling for securing hand controls to a cylindrical handlebar tube as defined in claim 7 wherein the distance between the front and rear surfaces of said hand control housing is less than the distance between the first and second planes formed at the interfaces between the cylindrical central bore and the spherical outer surface of said engagement collar.

* * * * *